United States Patent [19]
Hansen et al.

[11] Patent Number: 5,301,803
[45] Date of Patent: Apr. 12, 1994

[54] PACKAGE FOR INDEX PRINT SHEET AND CASSETTE

[75] Inventors: David E. Hansen, Fairport, N.Y.; William H. Valls, Harwinton, Conn.

[73] Assignee: Eastman Kodak Company, Rochester, N.Y.

[21] Appl. No.: 3,362

[22] Filed: Jan. 12, 1993

[51] Int. Cl.⁵ .............................. B65D 85/67
[52] U.S. Cl. .................... 206/232; 206/389; 206/455
[58] Field of Search ............ 40/124, 124.1, 124.2, 40/124.4, 152, 152.1, 154, 156, 157, 158.1, 159, 159.2; 206/0.8, 0.81–0.84, 45.34, 216, 223, 225, 232, 333, 387, 389, 391, 409, 425, 444, 449, 450, 454–456, 457, 459.5, 461–483, 559–565, 581; 242/71, 71.1, 71.7; 281/21, 22, 26, 28, 31, 51; 434/429

[56] References Cited
U.S. PATENT DOCUMENTS

| | | | |
|---|---|---|---|
| 4,049,119 | 9/1977 | Wilson | 206/472 |
| 4,120,399 | 10/1978 | Clarke | 206/474 |
| 4,443,959 | 4/1984 | Ackeret | 40/152 |
| 4,676,374 | 6/1987 | Wilkins | 206/455 |
| 4,870,764 | 10/1989 | Boone | 40/124.1 |
| 4,936,462 | 6/1990 | Yuen | 206/232 |
| 4,957,205 | 9/1990 | Rose, Jr. | 206/472 |
| 5,161,907 | 11/1992 | Byrne | 206/387 |

Primary Examiner—Jimmy G. Foster
Attorney, Agent, or Firm—Roger A. Fields

[57] ABSTRACT

A package is disclosed for a cassette containing an image bearing medium having a plurality of images recorded on it and for an index print sheet on which are printed a plurality of pictures that match the plurality of images on the image bearing medium. According to the invention, the package comprises an envelope for storing the index print sheet with its pictures visible, and a holder for the cassette. Respective means are located on the envelope and the holder for engaging to affix the envelope and the holder to each other and for disengaging to release one from the other.

5 Claims, 3 Drawing Sheets

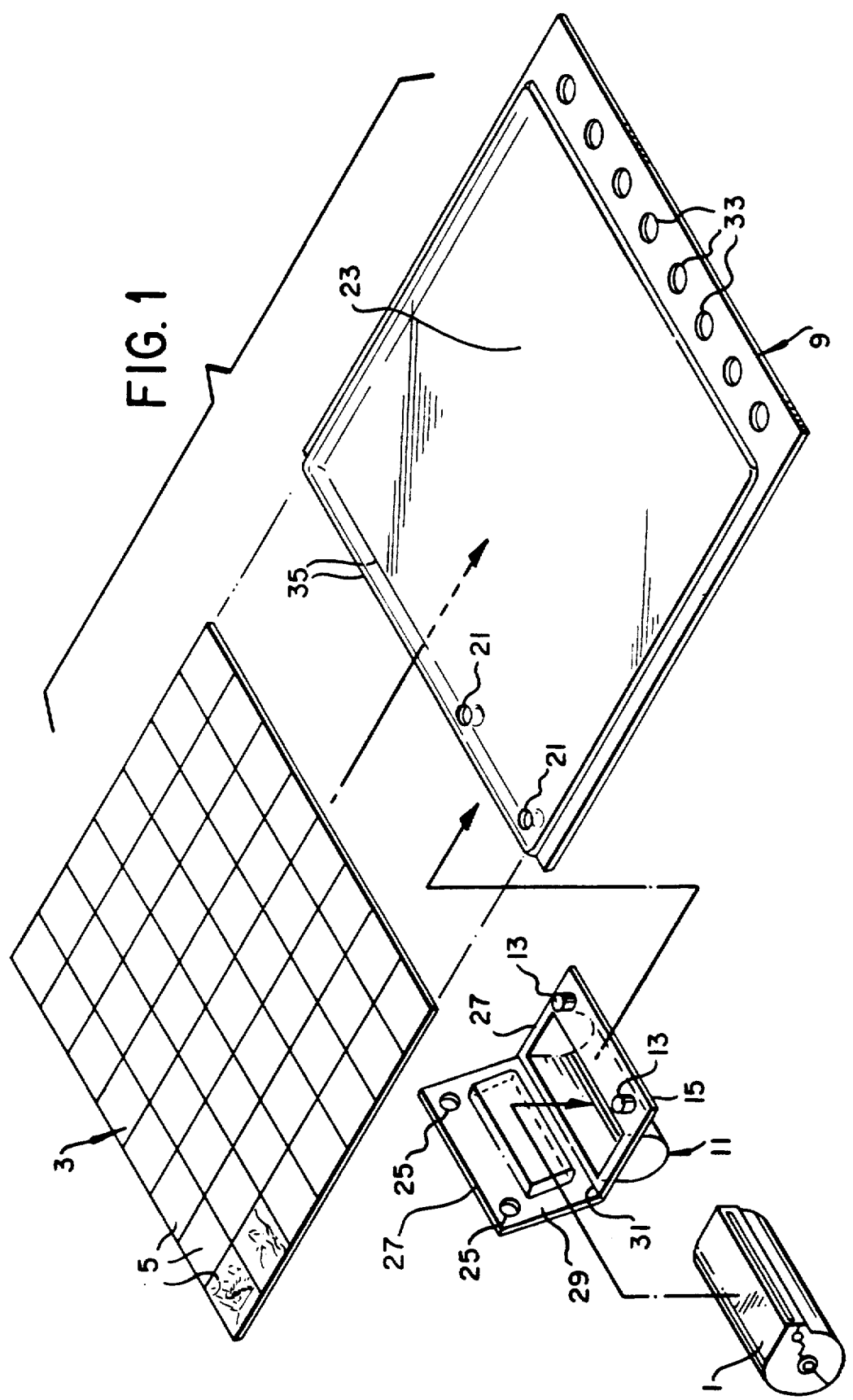

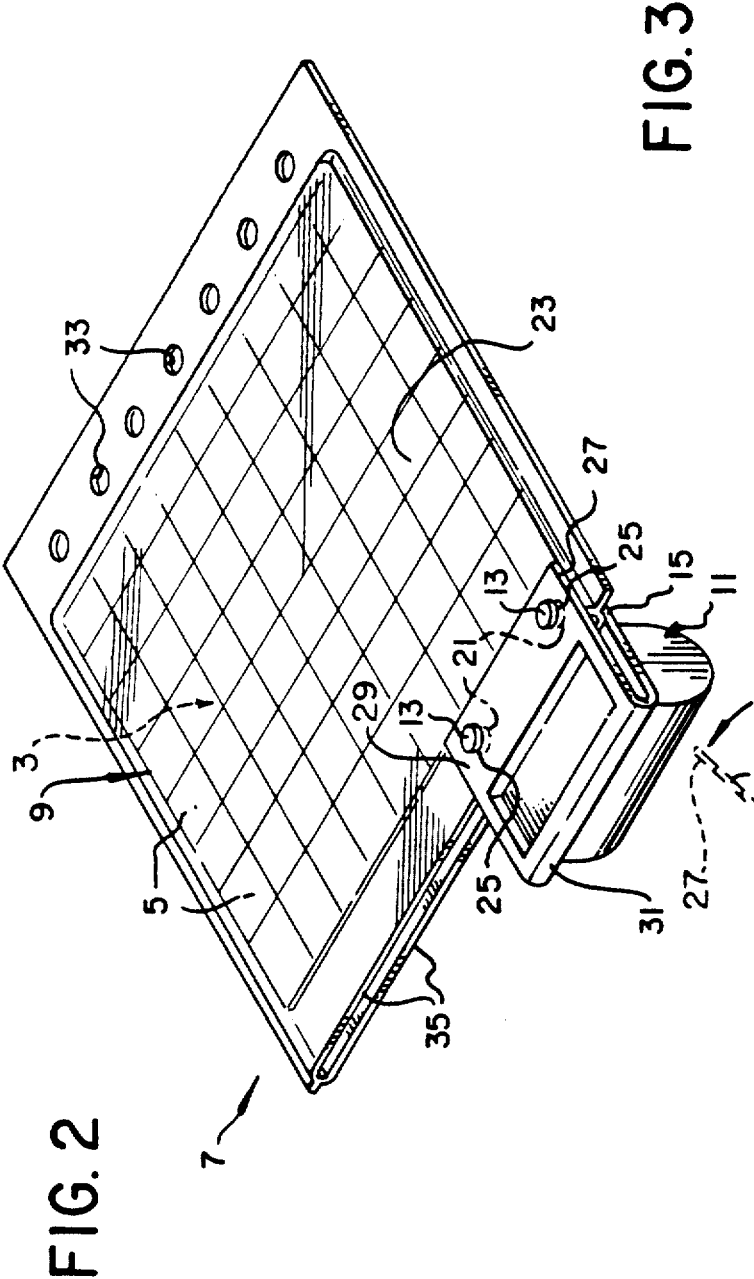
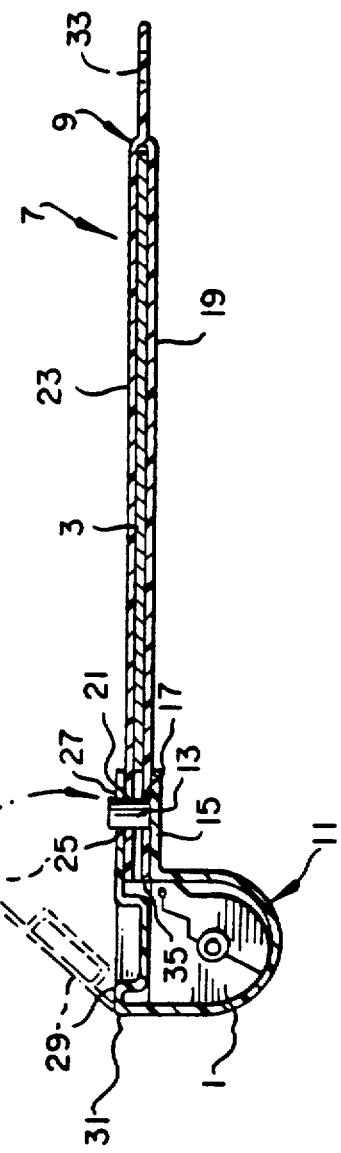

PACKAGE FOR INDEX PRINT SHEET AND CASSETTE

BACKGROUND OF THE INVENTION

1. Field of the Invention

The invention relates to a package for a cassette holding an image bearing medium having a plurality of images recorded on it and for an index print sheet on which are printed a plurality of pictures that match the plurality of images on the image bearing medium.

2. Description of the Prior Art

Generally, a processing laboratory gives the customer a processed photographic negative film and photographs which are enlarged and printed from the film. The negative film is usually cut into several sections, each one containing the same number of negatives and inserted in an open-ended sheath or sleeve. Many customers store the photographs in an envelope (with the negatives), making it difficult to later find a particular photograph.

Index or contact print sheets have been proposed which make it easier to find a particular negative. An index print sheet has printed on it several rows of pictures that match the negatives. The pictures are numbered in accordance with numbering of the negatives.

A book-like container for the index print sheet, the negatives, and individual prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the index print sheet along a mid-line. This flexing can possibly damage the index print sheet. The cassette is stored in an interior pocket raised from the base. This arrangement makes the container rather bulky.

SUMMARY OF THE INVENTION

A package is provided for a cassette containing an image bearing medium having a plurality of images recorded on it and for an index print sheet on which are printed a plurality of pictures that match the plurality of images on the image bearing medium. According to the invention, the package comprises an envelope for storing the index print sheet with its pictures visible, and a holder for the cassette. Respective means are located on the envelope and the holder for engaging to affix the envelope and the holder to each other and for disengaging to release one from the other.

BRIEF DESCRIPTION OF THE DRAWINGS

FIG. 1 is a perspective view of a package according to a preferred embodiment of the invention, showing how a holder for a cassette is opened to receive the cassette and how an index print sheet is inserted into a transparent envelope;

FIG. 2 is a perspective view of the holder with the cassette in it and the envelope with the index print sheet in it, showing the holder and the envelope affixed to each other;

FIG. 3 is a sectional view similar to FIG. 2.

DETAILED DESCRIPTION OF THE PREFERRED EMBODIMENT

Figure 4:
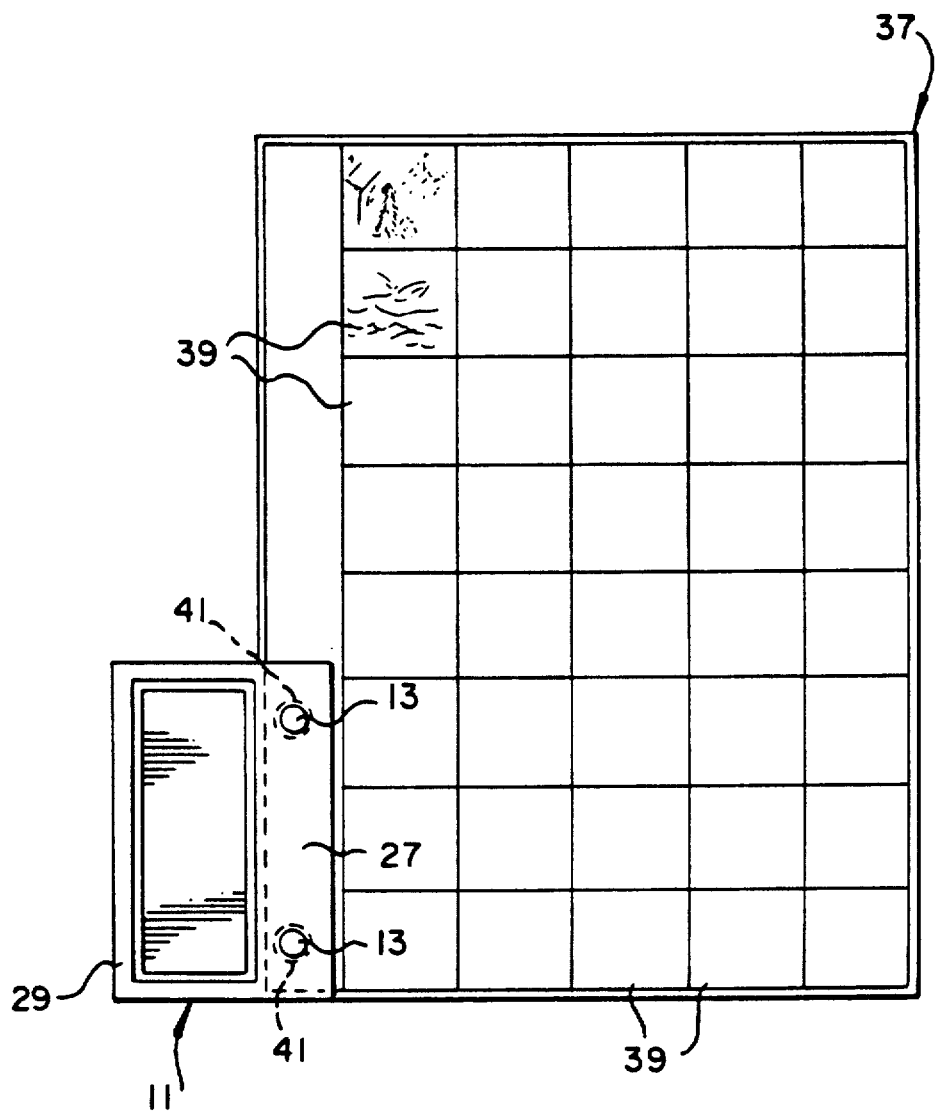
FIG. 4 is a top plan view of a package according to an alternative embodiment of the invention, showing the holder with the cassette in it connected directly to the index print sheet.

Referring now to FIG. 1, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 holds a rolled filmstrip, not shown, having a series of successively numbered negatives.

An index print sheet 3 similar to the one disclosed in U.S. Pat. No. 4,966,285, issued Oct., 30, 1990, has a series of pictures 5 printed on it that match the negatives on the filmstrip inside the cassette 1. The pictures 5 are numbered in accordance with numbering of the negatives.

A package 7 for the cassette 1 and the index print sheet 3 is shown in FIGS. 1-3. The package 7 comprises a transparent page-like plastic envelope 9 for storing the index print sheet 3 with its pictures 5 visible through the envelope and a transparent or opaque plastic holder 11 shaped substantially similar to the shape of the cassette 1 for containing the cassette. The holder 11 includes a pair of identical integral studs 13 that project from a lip-like extension 15 of the holder through respective holes 17 in one side 19 of the envelope 9 and through respective holes 21 in another side 23 of the envelope to affix the holder and the envelope to each other. See FIG. 3. Respective holes 25 in a lip-like extension 27 of a cover portion 29 of the holder 11 receive the two studs 13 to secure the holder closed. An integral "living" hinge 31 of the holder 11 permits the cover portion 29 to be swung to open the holder.

The envelope 9 includes a series of spaced perforations 33 for known binder rings in a storage book, not shown, and is open only along a longitudinal edge 35 to insert the index print sheet 3 between the two sides 19 and 23 of the envelope and to remove it from the envelope. As shown in FIG. 3, the longitudinal edge 35 of the envelope 9 is located between the two lip-like extensions 15 and 27 of the holder 11 when the studs 13 project through the respective holes 17, 17, and 21, 21 in the two sides 19 and 23 of the envelope and through the respective holes 25, 25 in the cover portion 29 of the holder. In this instance, the index print sheet 3 cannot be removed from the envelope 9.

ALTERNATIVE EMBODIMENT

FIG. 4 shows an alternative embodiment of the invention in which the holder 11 is connected directly to an index print sheet 37 having a series of pictures 39 which are the same as the pictures 5 on the index print sheet 9. The index print sheet 37 has a pair of holes 41 for receiving the respective studs 13 of the holder 11 to connect the holder directly to the index print sheet similar to the way the holder is affixed to the envelope 9 as shown in FIGS. 2 and 3.

The invention has been described with reference to a preferred and alternative embodiments. However, it will be appreciated that variations and modifications can be effected within the ordinary skill in the art without departing from the scope of the invention.

We claim:

1. A holder for a cassette containing an image bearing medium having a plurality of images recorded on it, and a photsensitive paper sheet on which is to be printed a plurality of pictures that match the plurality of images on the image bearing medium, is characterized in that:

said holder and said sheet have respective mans for engaging one another to affix the holder with the cassette in it and the sheet with the plurality of pictures printed on it to each other and for disengaging to release one from the other; and said holder includes hinge means for opening the holder to insert the cassette into the holder and to remove it from the holder and integral means for securing said engaging means located on the holder to maintain the holder closed when the engaging means and said engaging means located on said sheet are engaged to affix the sheet and the holder to each other.

2. A package for a cassette containing an image bearing medium having a plurality images recorded on it and for an index print sheet on which are printed a plurality of pictures that match the plurality of images on the image bearing medium, said package comprising:

an envelop for storing the index print sheet with its pictures visible, and adapted to permit the index print sheet to be removed from it;

a holder for the cassette; and respective means located on said envelope and said holder for engaging to affix the envelope and the holder to each other and for disengaging to release one from the other, and arranged to prevent removal of the index print sheet from the envelope when they are engaged to affix the envelope and the holder to each other.

3. A package for a cassette containing an image bearing medium having a plurality of images recorded on it and for an index print sheet on which are printed a plurality of pictures that match the plurality of images on the image bearing medium, said package comprising:

an envelope for storing the index print sheet with its pictures visible; and open along a particular edge to insert the index print sheet into said envelope and to remove it from the envelope;

a holder for the cassette; and respective means located on said envelope and said holder to engaging to affix the envelope and the holder to each other and for disengaging to release one from the other, said engaging means located on said envelope being arranged proximate said particular edge to position said holder at the particular edge to prevent removal of the index print sheet from the envelope when the engaging means and said engaging means located on the holder are engaged to affix the envelope and the holder to each other.

4. A package for a cassette containing an image bearing medium having a plurality of images recorded on it and for an index print sheet on which are printed a plurality of pictures that match the plurality of images on the image bearing medium, said package comprising:

an envelope for storing the index print sheet with its pictures visible, and open along a particular edge to insert the index print sheet into said envelope and to remove it from the envelope;

a holder for the cassette; and respective means located on said envelope and said holder for engaging to affix the envelope and the holder to each other and for disengaging to release one from the other;

said holding including a pair of substantially parallel lip-like extensions that are arranged to have said particular edge between them to prevent removal of the index print sheet from said envelope when said engaging means located on the holder and said engaging means located on the envelope are engaged to affix the envelope and the holder to each other.

5. A package for a cassette containing an image bearing medium having a plurality of images recorded on it and for an index print sheet on which are printed a plurality of pictures that match the plurality of images on the image bearing medium, said package comprising:

an envelope for storing the index print sheet with its pictures visible:

a holder adapted only to hold the cassette; and respective means located on said envelope and said holder for engaging to affix the envelope and the holder to each other and for disengaging to release one from the other;

said holder includes hinge means for opening the holder to insert the cassette into the holder and to remove it from the holder and integral means for securing said engaging means located on the holder to maintain the holder closed when that engaging means and said engaging means located on said envelope are engaged to affix the envelope and the holder to each other.

* * * * *

UNITED STATES PATENT AND TRADEMARK OFFICE
CERTIFICATE OF CORRECTION

PATENT NO. : 5,301,803
DATED : April 12, 1994
INVENTOR(S) : David E. Hansen, et. al.

It is certified that error appears in the above-indentified patent and that said Letters Patent is hereby corrected as shown below:

Column 3, line 6, delete "mans" and insert --means--.
Column 3, line 24, delete "envelop" and insert --envelope--.
Column 3, line 46, delete "to engaging" and insert --for--.

Signed and Sealed this

Thirtieth Day of August, 1994

Attest:

BRUCE LEHMAN

Attesting Officer        Commissioner of Patents and Trademarks